Nov. 8, 1955      V. H. BURDICK      2,723,164
SAFETY VALVE FOR TRUCK AND TRAILER AIR BRAKE SYSTEM
Filed July 6, 1954
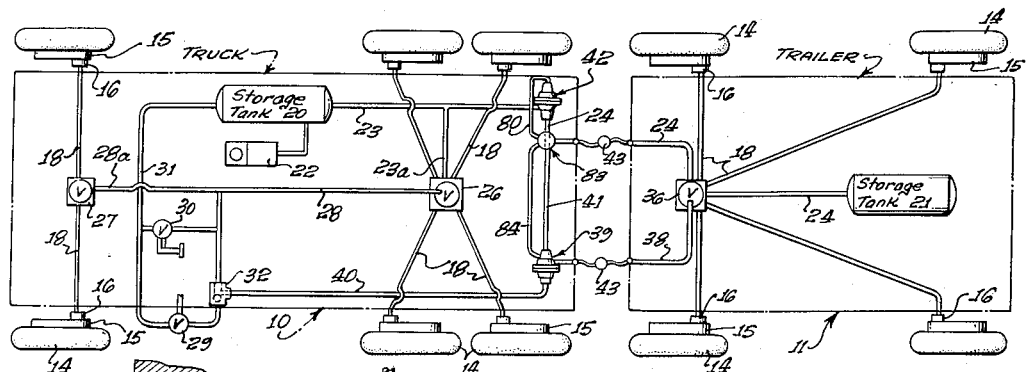
INVENTOR.
VINCENT H. BURDICK,
BY
Knight & Rodgers
ATTORNEYS.

United States Patent Office 2,723,164
Patented Nov. 8, 1955

2,723,164

SAFETY VALVE FOR TRUCK AND TRAILER AIR BRAKE SYSTEM

Vincent H. Burdick, Los Angeles, Calif., assignor to Burdick Bros. Inc., Gardena, Calif., a corporation of California Application July 6, 1954, Serial No. 441,551

8 Claims. (Cl. 303—26)

The present invention relates generally to compressed air systems for controlling the operation of vehicle brakes or the like, and more especially to a system of this character for a truck and trailer which includes safety means for preventing loss of compressed air as a result of mechanical failure in the system or when the trailer is being uncoupled.

A typical application of the present invention is in the air brake system commonly found on trucks and used to apply the brakes on the truck and on a trailer being towed by truck. The air brake system commonly includes a main supply system which interconnects a storage tank on the truck with one on the trailer to supply compressed air to the trailer tank from the truck and also is connected through remote control or relay valves to the brake cylinders to supply operating air to them for setting the brakes. A second or control system also receives air from a storage tank on the truck and runs from a master valve operated by the driver to the remote control valves which are actuated by air pressure in the control line to effect supply of air under pressure to the brake cylinders. Both the main supply system and the control system run from the truck to the trailer and they are each provided with hose sections between the truck and trailer equipped with couplings of conventional type so that air brake systems of the two vehicles can quickly be connected by the driver when the trailer is towed by the truck and the brakes of both vehicles can be controlled from a single master valve.

Braking systems of this type are subject to mechanical failures in any one of a number of different ways that result in a loss of air pressure, either slowly or suddenly. The serious nature of a complete failure of the air brake system on a motor vehicle is obvious and needs no detailed explanation. A brake failure while the vehicles are in motion renders them incapable of being stopped and often results in very serious accidents. Innocent vehicles or persons may suffer considerable damage from collision. Also, a substantial amount of secondary damage may result from fire following a collision involving a runaway truck.

In order to prevent a complete loss of function of the compressed air system in the event of a mechanical failure of some of the conduits, there has been devised a system of safety valves disclosed in co-pending application Serial Number 154,865 of Sherman R. Burdick, filed April 8, 1950, for "Safety Valve for Fluid Control System." The present invention is in the nature of an improvement upon and addition to the system of safety valves as disclosed in that application, and it will be found that certain of the structure disclosed herein is claimed broadly in said co-pending application.

The compressed air brake system disclosed in said co-pending application includes a relay valve connecting the air supply system with the air control system of the trailer and actuated by air in the air control system of the truck. Inasmuch as there is always some slight resistance to the operation of such a valve, a softer and quicker application of the trailer brakes can be effected by providing a means by which air in the control conduit of the truck can pass to the control conduit of the trailer on gentle application of the brakes without opening said relay valve, but which leaves said relay valve in the system for use in emergency application of the brakes or to prevent loss of air in case of a broken control line on the trailer.

The compressed air brake system disclosed in said co-pending application also includes an automatic safety valve in the air supply system which is adapted to close when, but not until, the air pressure in the supply system has dropped to a predetermined value. It is common practice for truck drivers to couple and uncouple the trailer in a manner which often breaks the air supply line to the trailer with the master control valve open so that a considerable amount of compressed air escapes to the atmosphere through a safety valve of this type since it does not close until there has been a substantial drop in operating air pressure on the truck. A great deal of air can be saved and the operation of the truck brakes made more certain and more efficient by providing means for closing this safety valve when the truck and trailer are uncoupled.

Hence, it is a general object of my invention to provide an air brake system for a truck and trailer which is safeguarded against being rendered completely inoperable by loss of operating pressure as a result of a break in one of the conduits carrying air under pressure.

It is also a general object of my invention to provide safety valves in a compressed air brake system having a main fluid supply system and a control fluid system that protect the system against complete loss of air and yet do not impair or retard the normal operation of the brakes on the trailer to an appreciable degree.

It is a further object of my invention to incorporate in an air brake system having safety valves, means for closing the safety valve in the main air supply system by the application of air from the control line in order to prevent loss of air from the system when the safety valve does not close normally until there has been a substantial drop in air pressure within the main supply system.

How the above objects and advantages of my invention, as well as others not specifically referred to herein, are attained will be more readily understood by reference to the following description and to the annexed drawing, in which:

Fig. 1 is a schematic plan of a truck and trailer showing a compressed air system for operating the brakes on these vehicles, constructed according to my invention;

Fig. 2 is an enlarged fragmentary section through a portion of the system showing in median section a preferred construction of valves embodying my invention;

Fig. 3 is a further enlarged fragmentary section corresponding to a portion of Fig. 2; and Fig. 4 is a fragmentary median section showing a modified form of one of the valves in Fig. 2.

Fig. 1 shows diagrammatically a compressed air system for operating the brakes on a truck and a trailer towed by the truck. In the art, the terms "truck" and "tractor" are used interchangeably as meaning the same thing so that the term "truck" is herein used in a broad sense to include any powered vehicle capable of being connected to or of towing another vehicle, referred to herein as a "trailer." The truck is indicated in general outline at 10 and the trailer at 11. Each vehicle is provided with a plurality of ground engaging wheels 14 each of which has a brake 15. Each brake is individually applied by a fluid actuated unit 16 which is commonly referred to as a brake cylinder. The brakes and brake cylinders are shown only diagrammatically since they may be of any conventional construction without limitation upon the present invention. The operating fluid under pressure is ordinarily air and is applied to each brake cylinder 16 by means of a branch supply line or conduit 18 connected to that cylinder.

Each vehicle carries a separate supply of fluid under pressure. One of these is storage tank 20 carried on the truck and another is storage tank 21 carried on the trailer. Any other suitable arrangement of tanks may be used. Motor driven compressor 22 on the truck compresses air and delivers it to storage tank 20 on the truck to replenish the supply of compressed air as it is drained out of the storage tank. A portion of the supply in each storage tank is used during each application of the brakes, since the air exhausted from brake cylinders 16 when the brakes are released is exhausted to the atmosphere. Air is used from storage tank 21 on the trailer for the application of the trailer brakes and is replenished from the forward tank on the truck by flow through a main air supply system which interconnects the two storage tanks for transfer of air from tank 20 to tank 21. This air supply system is also connected to each of the brakes on the two vehicles by branch lines 18 and other parts of the system as will be described.

The main air supply system includes a supply conduit extending between storage tank 20 and storage tank 21 and consisting generally of two sections of conduit, forward section 23 and rearward section 24. The rearward section extends between valve 42 and trailer tank 21. The forward section extends between storage tank 20 and safety valve 42, to be later described in detail, and includes, among other elements, branch line 23a which supplies air under pressure to a remotely controlled or relay type valve 26 which is preferably of the quick release type. From valve 26, air goes into branch supply lines 18, each leading to an individual brake cylinder 16. The operation of valve 26 is controlled by air pressure applied thereto through control conduit 28 which is connected at one end to relay valve 26 and is connected also to foot operated valve 30. Air line 28 extends forwardly at 28a to another relay valve 27 from which the brake cylinders on the front wheels are supplied with air from branch supply lines 18. Thus the line 28a acts both as a control line and a supply line. The valves 26 and 27 are usually of different types but may be used interchangeably as far as the present invention is concerned.

Both the foot operated master control valve 30 and a hand operated master control valve 29 are connected by a section of control conduit 31 to supply tank 20. It is common practice for hand valve 29 to operate only the trailer brakes and for foot valve 30 to operate both the truck and trailer brakes; and to obtain this type of control, check valve 32 is inserted in the control system in the position shown.

From check valve 32, the control conduit 40 extends rearwardly on the truck to safety valve 39, to be later described; and the control conduit then continues on at 38 from safety valve 39 to relay valve 36 on the trailer. Conduit 31 with the two master valves 29 and 30, valve 32, and conduits 40, 28 and 38 constitute what is generally referred to as a control air system for the truck and trailer. This control air system is generally divided into a forward section and a rearward section. The rearward section is conduit 38 which extends between valves 39 and 36. The forward section is mounted entirely on the truck and consists of the other elements already mentioned and is connected to storage tank 20 through conduit 31.

On the trailer, the rear section 24 of the supply conduit, passes through trailer valve 36 on its way from safety valve 42 on the truck to the trailer storage tank. Air from the compressor on the truck flows through the main supply conduit and passages within valve 36 to supply storage tank 21 on the trailer. Valve 36 on the trailer is remotely controlled by air pressure applied to it through the control system and is similar in operation to valve 26, but performs additional emergency functions. It acts as a check valve to prevent loss of air from the trailer storage tank and also to apply the trailer brakes if supply line 24 is broken ahead of valve 36, as is mentioned later. In response to air pressure applied through line 38, relay valve 36 controls the supply of air from tank 21 through individual branch lines 18 to each of the brake cylinders 16 on the trailer wheels, air flowing from tank 21 to valve 36 and then out to branch lines 18. Valve 36 may be of any conventional type of combination valve, as for example the valve shown in Fig. 6 of Eaton Patent 2,024,343 granted December 17, 1935 or may be replaced by a plurality of valves as disclosed in Lewis Patent 1,438,317 issued December 12, 1922.

From this it will be seen that the braking system on the trailer is in some respects independent of the braking system on the truck although it is dependent on the truck for replenishment of the supply of air used from tank 21 to apply the brakes on the trailer. It is connected to the truck system in two ways, both through the supply line for replenishment of air and through the control conduit for control of the trailer brakes so that they are applied along with the truck brakes when the driver manipulates foot valve 30. Because of this interconnection, the entire system may be viewed in some aspects as a single system.

The individual elements of the compressed air braking system so far mentioned have not been described in detail with reference to their structure since, with the exception of valves 39 and 42, they may be any of various known types of units suitable for the purposes named.

Distribution valve 36 on the trailer is operated by means of air pressure applied to it through the trailer control conduit 38 which is connected to valve 39. The forward section 40 of the control conduit is also connected to valve 39 from which it extends forwardly to its connection with check valve 32. Air for the operation of valve 36 may enter control conduit 38 from a cross connection 41 which interconnects the supply conduit 24 and control conduit 38 on the trailer side of valves 42 and 39 respectively. Consequently, cross connection 41 is shown as extending between these two valves. Valves 39 and 42 are mounted upon the body of truck 10, preferably near the rear as shown in Fig. 1 in order to require only the minimum length of connecting conduits.

It is to be noted that usually in each of conduits 24 and 38 there are hose sections extending between the truck and trailer and including a manually operated coupling 43. These couplings are well known and normally consist of two parts which may be fitted together in an air-tight manner to provide a continuous conduit between the truck and trailer when the two vehicles are operated together. The couplings are disconnected preparatory to detaching the trailer from the truck.

Valve 42 has a housing or body 44 which encloses an inner space 45. Body 44 is preferably made in two parts which are bolted together, in order to facilitate assembly of the valve and also to clamp flexible diaphragm 46 around its periphery between the two parts of the housing. Diaphragm 46 divides inner space 45 into two chambers 45a and 45b. In chamber 45a, there is compression spring 47 which at one end bears against diaphragm 46, a plate 48 being fastened to the diaphragm to distribute the load to the spring. The other end of spring 47 bears against movable abutment 50, the position of which may be adjusted axially of the spring by turning adjusting screw 51 which is threaded into an opening in valve body 44. By turning screw 51 to move abutment 50 inwardly, spring 47 is placed under greater compression and exerts a greater force on diaphragm 46. The force on diaphragm 46 may be decreased by turning screw 51 in the opposite direction to allow abutment 50 to move outwardly.

Hollow valve stem 52 is mounted upon diaphragm 46 to be moved by the diaphragm and is located on the side of the diaphragm opposite spring 47. At the forward end of stem 52, there is conical valve member 53 which is adapted to engage tapered seat 54 in body 44 of the valve. The pressure of spring 47 is in a direction to bias valve 53 towards engagement with this valve seat which is the closed position of the valve. When closed, valve 53 cuts off communication between conduit 23 and conduit 24, that is, between the forward and rearward portions of the main supply conduit. However, in operation valve 53 normally occupies the open position shown in Fig. 2 in which compressed air from conduit 23 can flow past the valve into conduit 24.

Supply line 23 connects to the body of valve 42 at a position in which it is constantly in communication with chamber 45b so that whatever air pressure exists in conduit 23 is communicated to one side of diaphragm 46. The air pressure in chamber 45b exerts a force on the diaphragm in opposition to the force exerted by spring 47; and the area of the diaphragm is such that when the air pressure is in excess of a certain predetermined value the diaphragm moves in response to the air pressure, to open and hold open valve 53 by moving the valve away from seat 54. Accordingly, when the air pressure in the main supply conduit falls below that predetermined value, spring 47 closes valve 53 with the result that the existing pressure can be trapped within the forward section of the supply line. The predetermined pressure at which valve 53 closes is established at a value high enough that the air pressure is adequate to operate the brakes on the truck. Typically it is about 50–60 p. s. i.

Section 24 of the main supply conduit is in free communication with valve chamber 45b whenever valve 53 is open; but when valve 53 is closed, this section of the supply conduit is cut off. However, it is desirable under some circumstances to provide limited communication to the chamber and for this purpose there is incorporated in valve stem 52 a check valve which has the effect of bypassing valve 53. The check valve consists of passage 55 which extends axially of valve stem 52 and is open at its outer end to section 24 of the supply conduit. At its inner end, passage 55 is closed by movable valve member 56 which is ordinarily held seated by spring 57. When valve 56 is opened by higher air pressure existing in passage 55 than in chamber 45b, air can flow past the valve and out of the valve stem through one or more ports 58 which open from the interior of the valve stem to valve chamber 45b. This check valve permits air to flow in a reverse direction around the main valve 53 when the pressure in the trailer supply line is but slightly greater than that in the truck supply line 23. Flow past check valve 56 is limited to this one direction. This valve 56 takes the place of valve 55 in the co-pending application Serial Number 154,865 of Sherman R. Burdick, performing exactly the same function.

Valve 39 has a housing or body 60 which encloses interior space 61. Valve body 60 is preferably made in two parts which clamp between them the periphery of flexible diaphragm 62 which extends across interior space 61 and divides it into two chambers 61a and 61b. Diaphragm 62 carries at one side plate 64 against which compression spring 65 bears. The other end of spring 65 bears against the valve housing. Plate 64 serves also as means for supporting valve stem 66 on diaphragm 62, the stem carrying a movable valve member 67 of conical shape which is adapted to move into engagement with tapered valve seat 68 formed on the valve body 60. Both diaphragms 46 and 62 are pressure sensitive members connected respectively to valves 53 and 67 for the purpose of moving the associated valve between open and closed positions in response to certain pressures; and it will be realized that other types of pressure responsive members may be substituted.

Forward section 40 of the control air conduit is connected to valve 39 at a position to communicate freely at all times with interior chamber 61b at one side of the diaphragm with the result that air pressure in the control line is also applied to diaphragm 62 in the direction which tends to move the diaphragm and valve 67 toward the open position of the valve shown in Fig. 2, in opposition to spring 65. The rearward section 38 of the control conduit is connected to the body of valve 39 at a position where it is normally in free communication with valve chamber 61a; and the pressure existing in this section of the control line is applied to the other side of diaphragm 62 in opposition to the air pressure from conduit 40 and in a direction to move valve 67 into engagement with seat 68 to close this valve.

In the preferred form of my invention diaphragm 62 is provided with one or more small openings 69 which are open at all times and provide restricted communication between the two valve chambers 61a and 61b. The gross area of openings 69, if more than one, is such that at relatively low pressure differentials across diaphragm 62, all air entering 61b from line 40 flows through openings 69 into conduit 38 without moving diaphragm 62 and opening valve 67. But when air flows in from conduit 40 at a higher rate, because either foot valve 30 or hand valve 29 is open to a greater extent, the pressure differential across diaphragm 62 becomes sufficient to move diaphragm 62 in response to this pressure and open valve 67.

Valve 39 is connected with the air supply system by means of cross connecting conduit 41. The connection of line 41 to valve housing 60 is located so that valve seat 68 and valve member 67 are interposed between conduit 41 and section 38 of the control conduit. When valve 67 is closed, there is no communication between the control conduit and the air supply system; but when valve 67 is open, as in Fig. 2, air can flow from the main supply conduit 24 past the valve into conduit 38 to valve 36 on the trailer.

Although openings 69 in diaphragm 62 are always open and allow passage of fluid in either direction between chambers 61a and 61b, yet they are of comparatively small area and consequently the rate of air flow is very restricted. In order to remove this restriction on reverse flow from conduit 38 through diaphragm 62 and back into conduit 40, it is preferable to incorporate within valve 39 a check valve which opens to permit air flow in this reverse direction only. This check valve means comprises a flexible disc 70 mounted on diaphragm 62 to overlie and close all of several openings 71 through the diaphragm (see Fig. 3). Disc 72 is on that side of diaphragm 62 away from valve 67 and is normally held by ring 72 against the diaphragm to close these openings 71. This ring is pressed against the disc by light pressure from spring 73 which at its other end bears against the inside of valve housing 60. Whenever the air pressure in chamber 61a exceeds that in chamber 61b by a small predetermined amount, disc 72 is moved away from diaphragm 62 sufficiently to open ports 71 and allow relatively rapid transfer of air into chamber 61b and forward section 40 of the conduit. For this reason, the total area of ports 71 is several times the total area of openings 69.

Valve housing 60 is provided at 78 with an annular valve seat. Plate 64 is provided with an insert 79 of softer material, for example neoprene or the like, in a position to engage annular seat 78. Thus when air pressure is applied from section 40 of the control conduit to one side of diaphragm 62 and is of sufficient magnitude, the diaphragm is moved towards the left as viewed in Fig. 2 to open valve 67 and to bring insert 79 into air-tight engagement with annular seat 78. In this position communication between the two sections of the control conduit is completely cut off and the rear section of the control conduit is in communication only through valve 67 and cross connection 41 with the air supply conduit 24. When the brakes are released, the force of spring 65 is sufficient to close valve 67 against seat 68 and to keep insert 79 spaced from seat 78.

Another means of providing for the free flow of air from chamber 61b to 61a is shown in the variational form of valve 39 illustrated in Fig. 4. This means can be used in place of openings 69 in diaphragm 62 or in addition thereto. This variational means consists in replacing solid valve stem 66 with a hollow tubular stem 95 within which stem 103, carrying movable valve member 96 and valve moving piston 101, is mounted for relative longitudinal movement. In this construction, movable valve member 96 is normally held against valve seat 97 by force exerted by spring 102 until sufficient air pressure is built up in conduit 24 to move valve actuating piston 101 forward against sealing means 100 and at the same time open valve 96. When valve 96 is spaced from seat 97, free communication from chamber 61b to chamber 61a is had past valve 96, through passageway 98 inside tubular stem 95, and openings 99 in the wall of stem 95. The air pressure at which spring 102 allows valve member 96 to open is normally the same as that at which valve member 53 of valve 42 is set to open. Thus when valve 55 closes, valve 96 also closes.

In order to achieve certain objects of my invention, means are provided for closing safety valve 42 in the supply conduit by application to the valve of air under pressure from the control air system. This is effected by passage means provided by conduits 80 and 84, air flow through the passage being controlled by valve means 83. Conduit 80 is connected at one end to valve 42 at a position such that the conduit is in communication through passage 81 with interior chamber 45a which is at the same side of diaphragm 46 as that upon which spring 47 bears. The other end of conduit 80 is connected to pressure responsive valve 83. From valve 83, conduit 84 leads to a connection with the control air conduit 40. For the sake of convenience, conduit 84 is shown as being connected directly to interior chamber 61b within valve housing 39; but since conduit 40 is always in free communication with this chamber the effect is the same as if conduit 84 were connected directly into conduit 40. Valve 83 is also connected by conduit 86 with the air supply conduit at a position on the trailer side of safety valve 42. For this purpose, conduit 86 is connected into rear section 24 of the air supply conduit.

Pressure responsive valve 83 comprises a body 88 made in two portions which clamp between them flexible imperforate diaphragm 89. In normal rest position, diaphragm 89 rests against annular valve seat 90 which surrounds internal passageway 91 to which conduit 84 is connected. When in contact with annular seat 90, diaphragm 89 seals off the end of passage 91 against communication with conduit 80. When out of contact with valve seat 90, air can flow from passage 91 around valve seat 90 and by means of passage 92 into conduit 80 to safety valve 42.

Both conduits 80 and 84 are connected to valve housing 80 at one side of diaphragm 89 so that when valve 83 is open, there is a continuous fluid passage between conduit 40 and valve 42. At the opposite side of diaphragm 89, conduit 86 is connected to the valve 83 so that air pressure transmitted from supply conduit 24 through passage 86 is applied to the under side of diaphragm 89 and in a direction to press the diaphragm against annular seat 90. It will be noticed in Fig. 2 that the under side of this flexible diaphragm is exposed to pressure over the entire area exposed to interior chamber 94; and this area is several times the area contained within annular seat 90 at the other side of the diaphragm. As a matter of practice, it has been determined to be advantageous to make the area on diaphragm 89 exposed to pressure from the supply system about five or six times as great as the area at passage 91 on the other side of the diaphragm exposed to pressure from the control conduit. As a consequence, air pressures on the two sides of the diaphragm during normal application and release of the brakes exert forces that keep the valve closed.

The operation of the several valves during normal operating conditions of the brake system will now be described briefly. Assuming an initial condition in which there is no operating pressure in storage tank 20 on the truck, the air pressure in both the main supply system and the control air system is zero. Consequently valves 53, 56, 67, 70 and 89 are closed as is valve 96 when used in place of holes 69. As the compressor 22 fills air tank 20, air pressure builds up in the storage tank and also in the air supply system. Assuming also that the trailer is coupled, pressure initially builds up only in the forward section of the fluid supply system since pressure cannot pass valve 53 and flow rearwardly into the section 24 until pressure is sufficient to open valve 53 by moving diaphragm 46 in response to this air pressure.

As mentioned above, valve 53 is set to open at a predetermined pressure which is above the minimum pressure at which storage tank 20 has sufficient pressure and air to operate safely the brakes on the truck. Typically this pressure may be established in the neighborhood of fifty to sixty pounds per square inch. When the pressure in tank 20 and conduit 23 reaches and goes above this predetermined pressure, say sixty p. s. i., valve 53 is opened by air pressure from conduit 23 exerted in chamber 45b against diaphragm 46. When valve 53 opens, air flows past the valve and into section 24 of the supply system, going through trailer valve 36 to trailer storage tank 21 and also opening valve 96 when used. Valves 56, 67, 70 and 89 remain closed. This is a normal situation with the truck and trailer brakes released and is maintained up to the maximum value for air pressure at which compressor 22 is shut off. According to currently established practice, the maximum air pressure in the supply system is normally about 100–120 p. s. i. and this same pressure exists in the supply conduits 23 and 24.

The air pressure in the main supply system is communicated through passage means 86 to one side of diaphragm valve 89, the pressure on the diaphragm being in a direction to seat the valve against annular seat 90 and hold the valve closed. This shuts off communication between conduits 80 and 84.

Assume now that the brakes are applied on both vehicles by depressing the foot pedal at valve 30. Air under pressure then passes through valve 30 and control line 28 to valve 26 which operates in a conventional manner to supply operating air from branch line 23a to branch conduits 18 to operate the individual brake cylinders 16 on the rear wheels of the truck. Line 28a supplies air directly to the front wheel brakes through valve 27. Air under pressure passes through check valve 32 into the forward section 40 of the truck control conduit with the result that air pressure is built up in chamber 61b of valve 39. If foot valve 30 is opened only a little way so that the pressure built up in chamber 61b is relatively small, the air passes through openings 69 in diaphragm 62, or through valve 96 and passageways 98 and 99, and on into rear section 38 of the control conduit without opening valve 67. Air in control conduit 38 operates trailer valve 36 to cause air to pass through the valve from storage tank 21 to operate the brake cylinders 16 on the trailer. This is the normal condition when brakes are applied lightly for a slow stop.

If the foot valve at 30 is opened rapidly or fully, as when bringing the truck and trailer to a fast or emergency stop, then the air pressure in line 40 and in chamber 61 goes up comparatively rapidly, establishing a substantial pressure across diaphragm 62. This differential pressure is adequate to move the diaphragm to the left, as viewed in Fig. 2, and valve 67 is opened. Operating air under high pressure now passes valve 67 and reaches control line 38 from supply conduit 24 by means of cross connection 41. In this way air pressure within conduit 38 is built up rapidly without any time lag in the application of the trailer brakes that might result if air could be applied to this section of the control conduit only through diaphragm openings 69, or valve 96. Valve 67 remains open as long as there is a substantial differential in pressure across diaphragm 62. As foot valve 30 is kept open, this differential pressure across diaphragm 62 diminishes eventually to the point where spring 65 closes valve 67.

In order to release the brakes, the foot pedal is released returning valve 30 to its off position in which control conduits 28 and 40 are vented to the atmosphere to permit the escape of air in these lines. Reduction in air pressure in these control lines causes valves 26 and 27 quickly to relieve the pressure in branch lines 18 and release brake cylinders 16. Valves 26 and 27 are designed to vent directly to the atmosphere in order to give a simultaneous release of all brakes that is practically instantaneous rather than the much slower release that would result if the air from the brake cylinders were required to drain back to a point, for example valve 30, which is much more remote from the brake cylinder.

It was mentioned above that when pressures in control conduits 38 and 40 are equal or nearly so, valve 67 is closed by the action of spring 65 cutting off the connection of the control conduit with the main supply conduit 24. As air is exhausted from line 40 and the pressure therein drops, air flows out of conduit 38 into line 40 through diaphragm openings 69, or through valve 96 when used. These openings are sufficient to accommodate the reverse flow of air past the diaphragm only at a low rate. A faster rate of air flow through the diaphragm is obtained by automatic opening of ports 71 in the diaphragm as a result of higher air pressure existing in valve chamber 61a. Air can flow now in a reverse direction through both sets of openings 69 (or 96) and 71. This drop in pressure in control conduit 38 causes trailer valve 36 to release the pressure quickly in all the branch lines 18 and the connected brake cylinders 16 on the trailer. A desirable feature of valve 36 is this quick release of operating air in order to effect simultaneous and substantially instantaneous release of all the trailer brakes along with release of the truck brakes. It will be noted that throughout the normal operation of the braking system, the total force applied through passage 86 to one side of diaphragm valve 89 is greater than the force applied to the other side through passages 84 and 91 from control conduit 40. As a consequence this valve remains closed and the operation of valves 42 and 39 is in no way altered by the presence of valve 83.

Safety valves 42 and 39 operate to safeguard the compressed air system against the entire loss of operating air and air pressure in the event of a break at any one of several points in the supply system or control system. In order to render these safety units more fully effective, advantage is taken of the characteristics of emergency valve 36 on the trailer, as will be pointed out. However, valves 42 and 36 have independent utility since these valves function primarily to preserve intact the braking system on the truck regardless of whether or not an emergency valve 36 exists on the trailer. The operation of these two valves is set forth more fully in the co-pending application of Sherman R. Burdick, referred to above, but their action will be set forth briefly below.

In the event of a break occurring somewhere in the supply conduit between valves 42 and 36, pressure in line 24 is suddenly reduced as the air escapes to the atmosphere. This drains air from both conduits 23 and 24 until the pressure in the supply system drops to or below the predetermined value at which the air pressure in chamber 45b is no longer able to keep valve 53 open against the biasing effect of spring 47. The spring then closes valve 53, preserving this minimum operating pressure in the truck system. The drop in air pressure in line 24 causes valve 36 to operate automatically to shut off line 24 at valve 36 and admit air from trailer tank 21 directly to the brake cylinders on the trailer wheels to apply the trailer brakes. Application of the trailer brakes alone is ordinarily sufficient to stop the truck and trailer; but in any event the driver still has enough operating pressure on the truck to apply the brakes on the truck and thus the two vehicles can be brought to a safe stop. Application of air pressure to conduit 40 by operation of either valve 39 or 30 will under these conditions open valve 89 so that air will pass from conduit 84 to conduit 80 and on to chamber 45a thus retaining full air pressure on the truck so long as pressure is maintained in line 40 by application of valve 29 or 30.

If a rupture occurs in supply line 23 at some point between storage tank 20 and valve 42, pressure in the supply system again drops to the point where valve 53 is closed. Air pressure in section 23 of the supply system may continue to drop to substantially zero, leaving a higher pressure in conduit 24. This pressure is sufficient to open check valve 56 and drain off pressure from line 24 through check valve 56 and conduit 23 to the atmosphere until pressure is finally reduced to the point where valve 36 automatically operates to set the trailer brakes, as mentioned above. This application of the trailer brakes is effective to stop both the truck and the trailer, although not as rapidly as if the brakes on both vehicles were operative. In this situation, although there is no air pressure by which the driver can set the truck or trailer brakes, the brakes on the trailer are actuated automatically.

Another possibility is a failure in the control conduit 38 at some point between safety valve 39 and trailer valve 36, as for example by a loose coupling 43. Under this condition, assume the brakes are now applied by a slow or small opening of either foot operated valve 30 or hand operated valve 29. Since air is being admitted but slowly to control conduit 40, it may escape through diaphragm openings 69 (or valve 96) and conduit 38 to the break in the latter as rapidly as the air is admitted from conduit 40. When the driver senses this situation, he can then throw the valve 30 or valve 29 to a full open position which causes a greater differential in pressure across diaphragm 62 to be built up, moving it to the left. As a consequence, valve 67 opens and seat 78 engages insert 79 to prevent escape of the control pressure. There is trapped ahead of valve 39 in line 40 sufficient pressure to actuate the brakes on the truck.

At the same time, opening valve 67 drains the pressure from supply line 24, 23 through valve 67 and the break in line 38 to the atmosphere. The drop in pressure in the supply line causes the previously described actions to take place, that is, valve 53 closes to hold sufficient residual pressure on the truck to operate the truck brakes and the pressure on valve 36 via line 24 is reduced to the point where it goes into emergency action and automatically sets the brakes on the trailer. The brakes on both vehicles can be applied and held in "on" position as long as either valve 29 or 30 is open since the pressure continues to keep valve seat 78 in engagement with insert 79 to shut off escape of pressure at this point. Valve 89 opens, thus shutting off all flow through valve 53; and valve 36 remains in the emergency application position.

Because of the reduced pressure now existing in the brake system, compressor 22 starts automatically to deliver air to tank 20 and the brake system. Upon release of the truck brakes or upon releasing hand valve 29, the air in chamber 45a escapes through valve 89 and there is an almost immediate opening of valve 53. With the opening of valve 53, air flows through line 24 to trailer valve 36 and overcomes the emergency action of valve 36, releasing the trailer brakes. This is an important feature of this brake system for this action of setting or releasing the trailer brakes is very rapid in either instance. Thus there is no danger of the truck and trailer being stalled with the brakes set so that the truck or trailer cannot be moved, should the driver need to apply the brakes when the control conduit 38 between the truck and the trailer is broken.

A fourth possibility is a break in conduit 40 forwardly of valve 39. This allows air to escape from the system when either of master valves 29 or 30 is opened to apply the brakes. Since control pressure cannot be built up in conduit 40 because of this break in the line, valve 39 remains closed and the brakes of neither vehicle can be applied directly. However, as long as either valve 29 or 30 remains open, air drains out of the main supply system via storage tank 20 and the break in conduit 40, escaping to the atmosphere. The end result is a reverse flow through valve 56 that lowers pressure in the supply system and causes application of the trailer brakes as a result of automatic emergency action by trailer valve 36.

Another possibility is the break-away of the trailer, tearing out both lines 38 and 24 rearwardly of safety valves 39 and 42. From the above discussion it will be apparent that valves 39 and 42 operate in this situation to preserve the operating integrity of the truck system so that brakes can be applied on the truck itself. If the truck driver does nothing, pressure in the brake system on the truck drops until valve 53 closes; but even at this lowered pressure, which can be maintained indefinitely with the assistance of compressor 22, the truck brakes can be operated at all times in a normal manner. But should the driver desire to maintain full pressure in the truck brake system, he can do so by applying air pressure to the left of diaphragm 46 (cavity 45a) as described below.

It is a widely followed custom for truck drivers when they leave the cab of the truck to uncouple the trailer, to leave the hand lever controlling valve 29 at the "on" position in order to set the trailer brakes. When the air hoses between the truck and trailer are now broken by disconnecting couplings 43, the situation is somewhat similar to a breakaway of the trailer from the truck. Pressure in control conduit 38 immediately drops to zero with the result that the pressure differential across diaphragm 62 is sufficient to move the diaphragm into a position in which insert 79 engages seat 78 to close off flow out of chamber 61a. At the same time, pressure in supply line 24 drops to zero, bringing about a similar decrease in the air pressure on diaphragm 89. The air pressure in passage 91 is now sufficient to move the diaphragm away from seat 90, opening the valve and permitting air to flow from control line 40 through passageways 84 and 80 into chamber 45a of valve 42. Here the air pressure builds up against diaphragm 46 and is in a direction to reinforce or add to the pressure exerted by spring 47 tending to close valve 53. Although air pressure considered alone would eventually become equal on the two sides of diaphragm 46, the force of spring 47 is still available to close the valve 53 against the normal pressure in the supply line. This latter action takes place almost instantaneously with the result that full normal operating pressure is retained in the supply system on the truck alone without requiring that the operating pressure drop to the lower value at which valve 53 closes. Closing valve 53 at this time keeps a higher operating pressure on the truck which saves air in storage tank 20, cuts down on the load on compressor 22, and makes the truck braking system more safe and efficient because of the higher available operating pressure.

When the trailer is recoupled to the truck, the driver ordinarily moves the handle of valve 29 to the "off" or release position. As a consequence, air pressure in section 40 of the control conduit drains off through this valve to substantially zero; and likewise the pressure in passageway 84 and on top of valve diaphragm 89 tending to open the valve is reduced. In turn, there is a similar reduction in pressure in chamber 45a of valve 42 since any residual pressure in passageway 80 is applied over a sufficiently large area of diaphraghm 89 to open the diaphragm and allow escape of this trapped pressure around valve seat 90 and through passage 91. This release of air pressure in chamber 45a permits the normal pressure in supply conduit 23 to open valve 53. The forward section of the supply line is then in free and open communication with the rearward section and trailer storage tank 21 is automatically filled if necessary from storage tank 20.

A build up of air pressure in conduit 24 to normal operating pressures applies the pressure on diaphragm valve 89 in a direction to seat the diaphragm against annular seat 90, closing the valve again to prevent the transfer of operating pressure from the control line to valve 42 through passages 84 and 80.

From the above description, it will be apparent that various change may be made, particularly in the detailed structures of the several valves, without departing from the spirit and scope of my invention. For this reason, it is to be understood that the foregoing description is considered as illustrative of, rather than limitative upon, the appended claims.

I claim:

1. In a compressed air system for operating the brakes on a truck and a trailer towed by the truck, the combination comprising: an air supply system including a storage tank on each vehicle and an air supply conduit interconnecting the two tanks and also connected to the brakes on both vehicles; a control air system connected to the air supply system and associated with the brakes to control supply of operating air thereto; automatic safety valve means in the air supply conduit adapted to close the air supply conduit, said safety valve means including a movable valve member biased toward a closed position and air pressure responsive means connected to said valve member and exposed at one side to air pressure existing in the supply conduit to move said valve member to open operating position when air pressure at said one side from the supply conduit is in excess of a predetermined minimum; and means for closing the safety valve by application of air from the control air system, said last mentioned means comprising passage means connected to the other side of said air pressure responsive means in the safety valve and to the control air system to apply air under pressure to said pressure responsive means in a direction to move the valve member to closed position, and pressure responsive valve means in said passage means responsive to operating pressure in the air supply conduit to hold the last mentioned valve means closed.

2. A compressed air system as in claim 1 in which the last named pressure responsive valve means includes a movable diaphragm exposed at one side to pressure existing in the control air system and at the other side to pressure existing in the air supply conduit, the exposed area at said other side being several times the exposed area at said one side.

3. In a compressed air system for operating the brakes on a truck and a trailer towed by the truck, the combination comprising: an air supply system including a storage tank on each vehicle and an air supply conduit interconnecting the two tanks and also connected to the brakes on both vehicles; a control air system connected to the air supply system and associated with the brakes to control supply of operating air thereto; automatic safety valve means in the air supply conduit adapted to close the air supply conduit, said safety valve means including a movable valve member biased toward a closed position and air pressure responsive means connected to said valve member and exposed at one side to air pressure existing in the supply conduit to move said valve member to open operating position when air pressure at said one side from the supply conduit is in excess of a predetermined minimum; a second valve means in the control air system dividing the system into a forward section and a rearward section, said second valve means being also connected to the air supply conduit and including a movable valve member biased toward a normally closed position shutting off communication with said air supply conduit; and means for closing the safety valve by application of air from the control air system, said last mentioned means comprising passage means connected to the other side of said air pressure responsive means in the safety valve and to the forward section of the control air system to apply air under pressure to said pressure responsive means in a direction to move the valve member to closed position, and pressure responsive valve means in said passage means responsive to operating pressure in the air supply conduit to hold the last mentioned valve means closed.

4. A compressed air system as in claim 3 in which the second valve means also includes actuating means connected to the movable valve member of the second valve means for moving the valve member to an open position admitting air from the supply conduit to the rearward section of the control system in response to air pressure in the forward section of the control air system, the valve actuating means separating the forward and rearward sections of the control air system but allowing only restricted air flow from the forward section into the rearward section.

5. In a compressed air system for operating the brakes on a truck and a trailer towed by the truck, the combination comprising: an air supply system including a storage tank on each vehicle and an air supply conduit extending between wheels interconnecting the two tanks and also connected to the brakes on both vehicles; a control air system extending between the vehicles and connected to the air supply system and associated with the brakes to control supply of operating air thereto; automatic safety valve means mounted on the truck in the air supply conduit adapted to close the air supply conduit at a point on the truck to hold operating pressure in the section of the supply conduit between the safety valve and the truck storage tank, said safety valve means including a movable valve member biased toward a closed position and air pressure responsive means connected to said valve member and exposed at one side to air pressure existing in the supply conduit to move said valve member to open operating position when air pressure at said one side from the supply conduit is in excess of a predetermined minimum; and means on the truck for closing the safety valve means by application of air from the control air system, said last mentioned means comprising passage means connected to the safety valve at the other side of said air pressure responsive means and to the control air system at a location on the truck to apply air under pressure to said pressure responsive means in a direction to move the safety valve member to closed position, a pressure responsive valve on the truck in said passage means, and a second passage means connected to the supply conduit on the trailer side of the safety valve and to said pressure responsive valve to hold the valve closed in response to pressure existing in the air supply conduit.

6. In a compressed air system for operating the brakes on a truck and a trailer towed by the truck, the combination comprising: an air supply system including a storage tank on each vehicle and an air supply conduit interconnecting the two tanks and also connected to relay valves on both vehicles; a control air system connected to the air supply system and to the relay valves to control the supply and pressure of the operating air delivered to brake actuating devices; first automatic safety valve means in the air supply conduit dividing the supply conduit into forward and rearward sections and adapted to close the air supply conduit, said safety valve means including a movable valve member biased toward a closed position and air pressure responsive means connected to said valve member and exposed at one side to air pressure existing in the forward section of the air supply conduit to move said valve member to open operating position when air pressure in the forward section of said supply conduit is in excess of a predetermined minimum; and a second safety valve means in the control air system also connected to the air supply conduit between said automatic safety valve and the trailer and including a movable valve member biased toward a normally closed position shutting off communication with said air supply conduit, and air pressure responsive means connected to said last mentioned valve member and exposed at one side to air pressure which can be supplied to said control conduit by opening of master control valves at the discretion of the driver of the vehicles to move said last mentioned valve member to open position to supply control air to the remote control valves on the trailer, the last mentioned pressure responsive means including also means whereby control air can pass at a restricted rate through said second safety valve means to operate the remote control valves on the trailer without opening said last mentioned valve member connecting to the supply system.

7. A compressed air system as in claim 6 in which the first automatic safety valve means also includes a second movable valve member biased toward a closed position and serving as a check valve against flow of air from the forward to the rearward section of the supply conduit but allowing a reverse flow of air from the rearward to the forward section of the supply conduit past said automatic safety valve when said first mentioned movable valve member is in closed position and the air pressure in the rearward section of the supply conduit is greater than air pressure in the forward section.

8. A compressed air system as in claim 7 which also includes means for closing the first safety valve by application of air from the control air system, said valve closing means comprising passage means connected to the first safety valve at the other side of said air pressure responsive means in the first safety valve and to the control air system to apply air under pressure to said pressure responsive means in a direction to move the valve member of the first safety valve to closed position, and pressure responsive valve means in said passage means responsive to operating pressure in the air supply conduit to hold the last mentioned valve means closed.

References Cited in the file of this patent

UNITED STATES PATENTS

| | | |
|---|---|---|
| 1,438,317 | Lewis | Dec. 12, 1922 |
| 1,797,431 | Mathieson | Mar. 24, 1931 |
| 2,024,343 | Eaton | Dec. 17, 1935 |
| 2,084,707 | Robinson | June 22, 1937 |
| 2,451,139 | Williams et al. | Oct. 12, 1948 |